Figure 3:
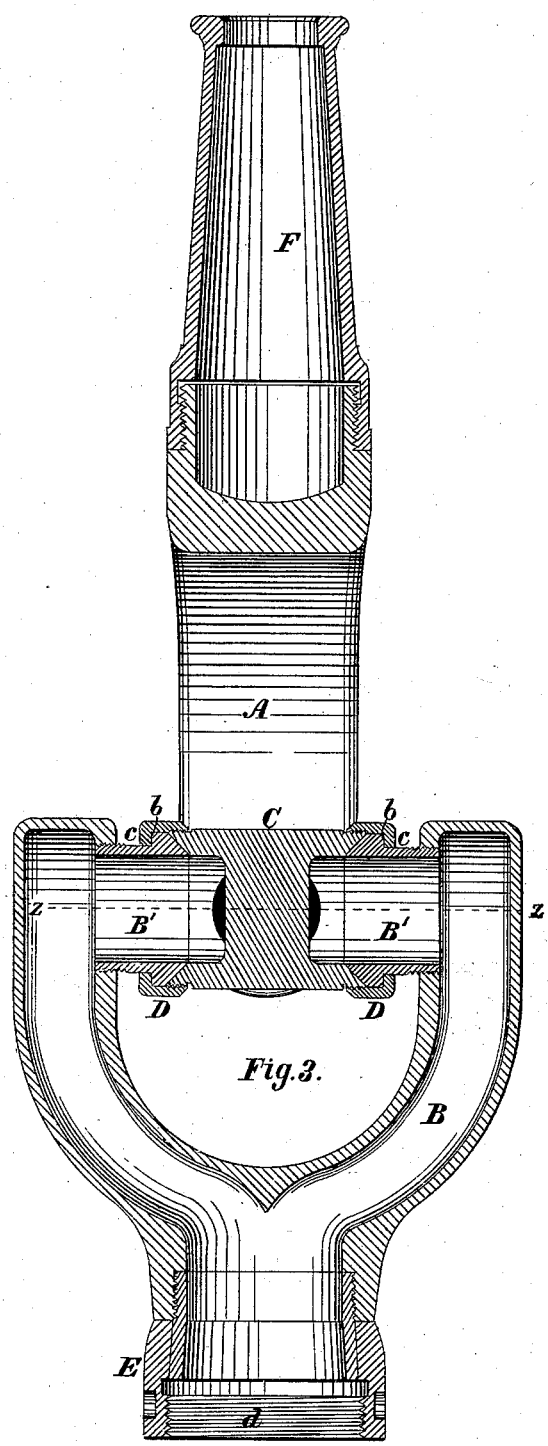

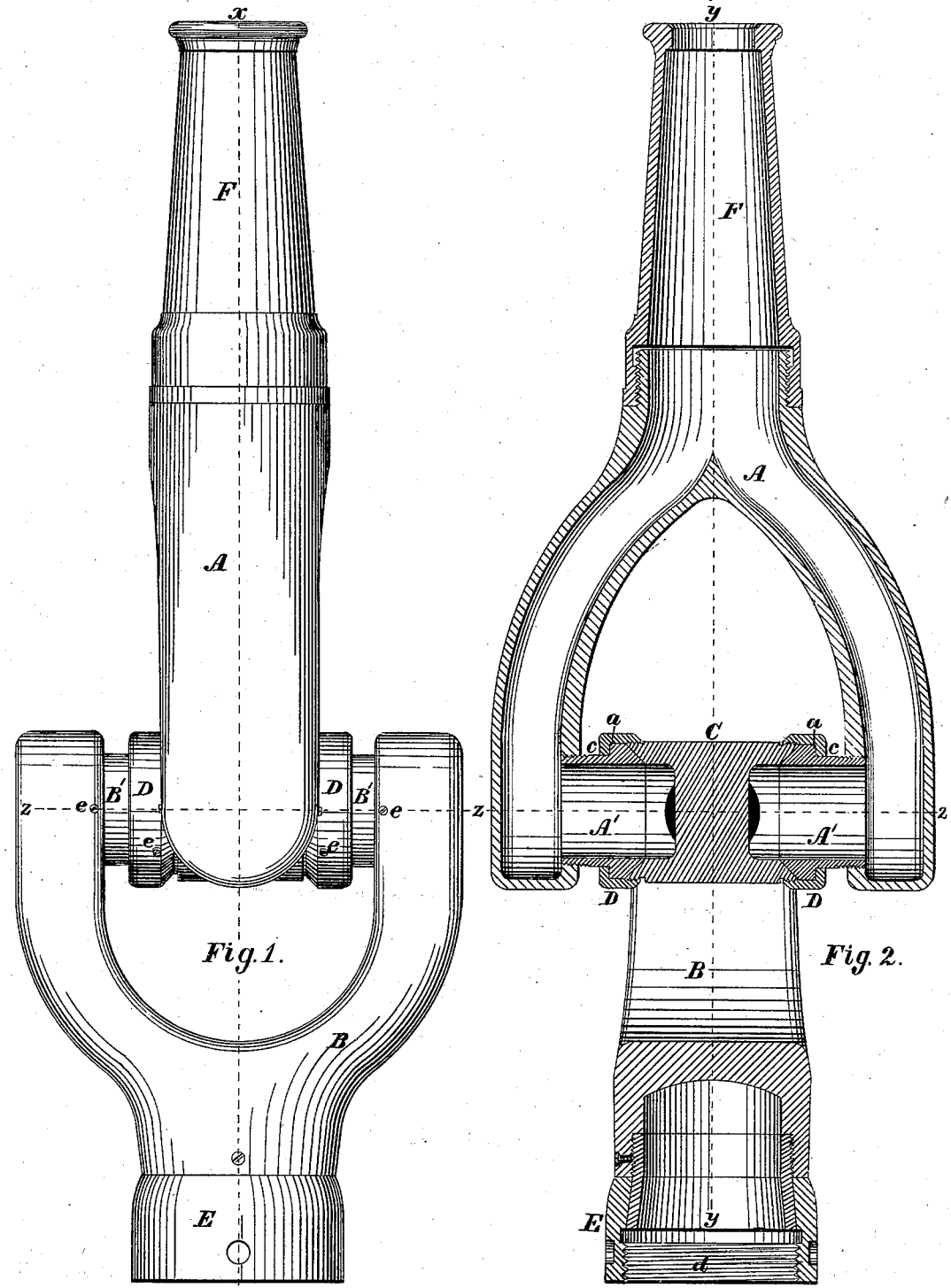

2 Sheets—Sheet 2.

B. HOLLAND, Jr.
Universal-Joint for Fire-Engine Hose.

No. 217,006. Patented July 1, 1879.

Witnesses:
E. A. Hemmenway
Benj. Andrews Jr.

Inventor:
Benjamin Holland Jr
by N. C. Lombard
Attorney.

UNITED STATES PATENT OFFICE.

BENJAMIN HOLLAND, JR., OF NEWPORT, RHODE ISLAND.

IMPROVEMENT IN UNIVERSAL JOINTS FOR FIRE-ENGINE HOSE.

Specification forming part of Letters Patent No. 217,006, dated July 1, 1879; application filed March 15, 1879.

*To all whom it may concern:*

Be it known that I, BENJAMIN HOLLAND, Jr., of Newport, in the county of Newport and State of Rhode Island, have invented a new and useful Universal Joint for Fire-Engine Hose and other Liquid-Conveying Pipes, of which the following, taken in connection with the accompanying drawings, is a specification.

My invention relates to an improved joint for fire-engine hose and other pipes, and is designed especially for use at the end of the suction-hose, to be coupled to the engine, and at or near the discharge-nozzles of the leading-hose.

The object of my invention is to render the suction-hose and the discharge-nozzle capable of being bent at right angles, if desired, to the main line of the hose.

It is well known that the suction-hose now in common use cannot be bent to a very short curve, and that, in consequence of its want of flexibility, much time is often consumed in "backing and filling" with the engine before it is finally fixed in the right position to accommodate the semi-rigid suction-pipe to the reservoir or other supply from which the engine is to draft.

On the other hand, the leading-hose may be bent at a comparatively short curve; but there are many times in a fireman's experience when it would be a great advantage to be able to bend the discharge-pipe at a right angle, or even to a greater angle than that, for the purpose of directing a stream upon the inside of a partition, while he is compelled by the great heat to remain outside of said partition, or can approach only to the doorway or window. This he cannot do with the present hose-pipes without collapsing or cramping his hose so as to virtually shut off the flow of the water, and he is therefore compelled to abandon the contest or cut a hole through the partition to enable him to bring his stream to bear in a more direct way, thus doing more damage with the ax than the fire would have caused had he been able to play a stream of full force upon the fire behind the partition by directing his stream around the corner thereof, as he will be able to do when my invention is adopted and applied to our fire-engines.

My invention consists in a gimbal or universal joint, made hollow throughout, and adapted to permit the free flow of water or other liquids through the same in whatever position one section of said joint may be placed relatively to the other section, and provided with suitable means for readily attaching it to a suction or leading hose, and for securing it to the engine or to a discharge-nozzle.

It further consists in a peculiar construction of said hollow gimbal or universal joint, whereby it is rendered capable of being freely moved, one part upon the other, to any desired angle, and permitting the free flow of water or other liquid through the same without leakage, which will be best understood by reference to the description of the drawings, to be hereinafter given.

Figure 1 of the drawings is an elevation of my improved pipe-joint, with a leading-hose nozzle attached. Fig. 2 is a longitudinal section on line $x\,x$ on Fig. 1. Fig. 3 is a similar section on line $y\,y$ on Fig. 2; and Fig. 4 is a transverse section on line $z\,z$ on Figs. 1, 2, and 3.

A and B are two forked pipes, each having the extreme ends of its branches closed, and provided upon the inner face of each branch with a circular opening, into which is screwed the short pipe A' or B', respectively.

Figure 4:
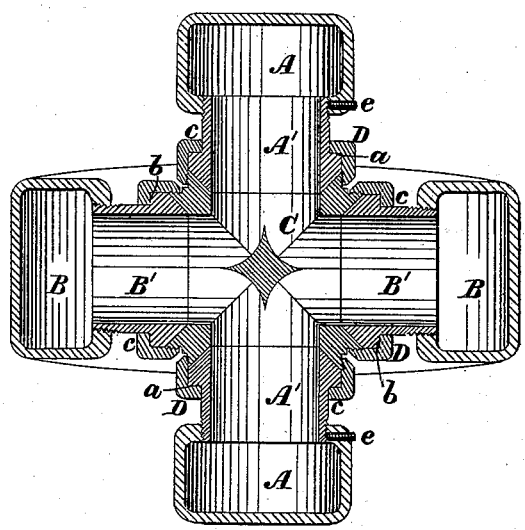

The pipes A' and B' are provided upon their inner ends with collars or shoulders $a$ or $b$, and have their extreme ends made conical and ground to fit water-tight to correspondingly-shaped seats formed in the ends of the four-way pipe C, as shown in Figs. 2, 3, and 4.

D D are coupling-rings, provided at one end with the inwardly-projecting annular lips $c$, adapted to fit, with a ground water-tight joint, to the shoulders $a$ or $b$, and having formed in their other ends female screw-threads to engage with corresponding male threads on the several branches of the four-way pipe C, as shown.

E is a swiveling coupling-ring attached to the forked pipe B, and provided with a female screw-thread, $d$, to engage with a corresponding male thread on the coupling attached to the suction or leading hose.

The pipe A may be coupled directly to the engine when applied to the suction-hose; or, if used in connection with the leading-hose, the discharge-nozzle F may be screwed thereon, as shown.

The four-way pipe C has cast therein, at the junction of the four branches thereof, a curved sided partition, which serves the purpose of dividing the streams of water as they enter and turning them in the desired direction.

The pipes A' and B', with the coupling-rings D placed thereon, are screwed into the pipes A and B some distance beyond the position which they are to occupy finally, so that the pipe C can easily be placed in position between them when they are adjusted to the conical seats formed in the ends of the several branches of the four-way pipe C, and the coupling-rings D are screwed onto the pipe C to firmly bind the whole together.

The pipes A' and B' and coupling-rings D, after being properly adjusted, are secured in position, and prevented from becoming displaced by the movements of the pipes A or B relative to each other by the set-screws $e\ e$.

What I claim as new, and desire to secure by Letters Patent of the United States, is—

1. The combination of a gimbal or universal joint, made hollow throughout, and adapted to permit the free passage of water or other liquid in whatever position one section thereof may be placed relative to the other, a swiveling coupling-ring attached to one end thereof, and a screw-thread upon its other end, substantially as and for the purposes described.

2. The combination of the forked pipes A and B, short pipes A' and B', each provided with a collar or shoulder, $a$ and $b$, respectively, and with conical ends, the four-way central pipe, C, provided with a conical seat in the end of each branch and an exterior or male screw, and four coupling-rings, D, all arranged and adapted to operate substantially as and for the purposes described.

Executed at Boston, Massachusetts, this 12th day of March, A. D. 1879.

BENJAMIN HOLLAND, JR.

Witnesses:
 N. C. LOMBARD,
 E. A. HEMMENWAY.